Jan. 1, 1952

R. BREZEK 2,581,072

REAR FENDER ACCOMMODATION OF RADIATOR
FOR REAR ENGINE VEHICLES

Filed Feb. 27, 1948

Inventor
Rudolf Brezek
by Singer, Ehlert, Stern & Carlberg
Attorneys

Patented Jan. 1, 1952

2,581,072

UNITED STATES PATENT OFFICE 2,581,072

REAR FENDER ACCOMMODATION OF RADIATOR FOR REAR ENGINE VEHICLES

Rudolf Březek, Prague-Smichov, Czechoslovakia, assignor to Tatra narodni podnik, Koprivnice, Czechoslovakia Application February 27, 1948, Serial No. 11,784
In Czechoslovakia April 16, 1946

Section 1, Public Law 690, August 8, 1946
Patent expires April 16, 1966

3 Claims. (Cl. 180—54)

In motor vehicles having the engine arranged in the rear vehicle portion, a radiator, arranged in the front portion of the vehicle, is used when water-cooled engines are employed; the accommodation of the radiator being the same as where an engine is provided in the front part of the vehicle.

Such an arrangement, however, presents the drawback, that between the radiator and the motor a long pipeline must be arranged, said pipeline extending throughout the length of the vehicle and being very delicate as to its tightness; and, if accommodated inside the vehicle body in order to be protected against any possibility of being damaged, it radiates the heat into the inner room of the vehicle body.

This drawback is eliminated in accordance with the present invention by providing the radiator on both sides of the rear portion of the body inside spaces formed out of the front portion of the rear mudguards. To such purpose said mudguards are provided with suitable shutter-like aerating openings.

The accompanying drawing shows diagrammatically, merely by way of example, an embodiment of the invention.

Figure 1:
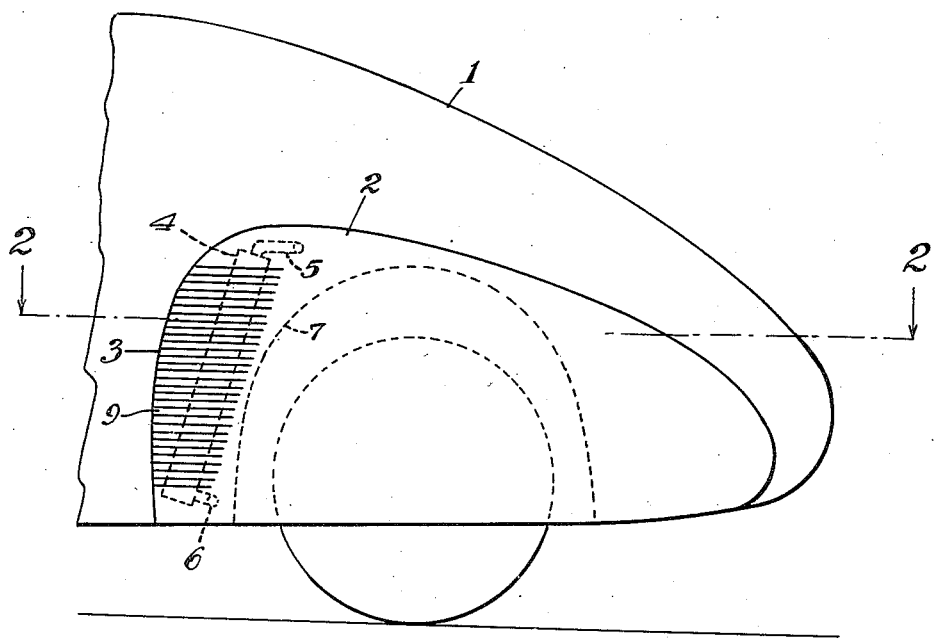
Figure 2:
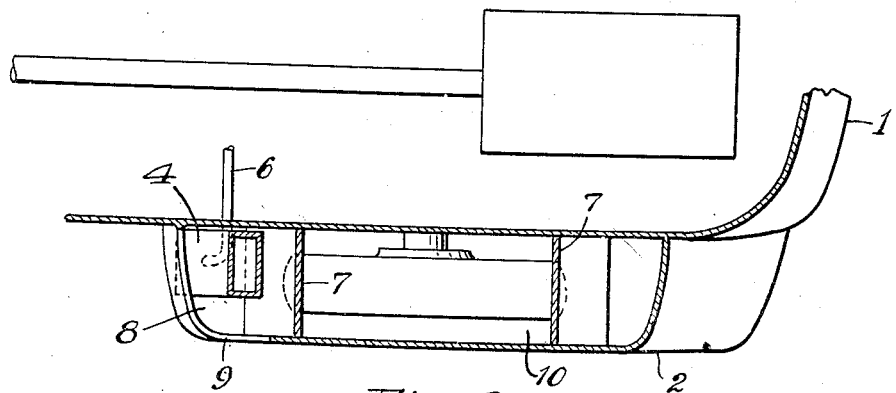

Fig. 1 illustrates in side elevation view the rear portion of the motor vehicle, and Fig. 2 is a horizontal sectional view on line 2—2 of Fig. 1.

At the rear body portion 1 accommodating the engine, both lateral mudguards 2 are provided in their front parts 3 with shutter-like openings 9 behind which a radiator 4 is arranged and pipes 5 and 6 lead respectively to and away from the engine, for conducting the necessary cooling water thereto and heated water away therefrom. A partition 7 extending in spaced relation about the rear wheel separates the cooler space 8 from the wheel space 10. The radiator space may moreover be aerated by a fan driven by the engine and taking in the air through the radiator by means of suitable openings.

I claim:

1. In a motor vehicle having a rear body portion with a compartment for the engine, mudguards for the rear wheels extending laterally from the sides of said rear body portion, a radiator arranged within each mudguard directly in front of each rear wheel, the portion of the mudguards in front of the radiator being provided with shutter-like openings for the inlet of air, and pipe lines connecting said radiator with the engine compartment to permit a circulation of the engine cooling water through said radiators.

2. In a motor vehicle having a rear body portion with a compartment for the engine, mudguards for the rear wheels extending laterally from the sides of said rear body portion, a radiator arranged within each mudguard directly in front of each rear wheel, the portion of the mudguards in front of the radiator being provided with shutter-like openings for the inlet of air, a partition within said mudguards directly behind said radiators and in front of said rear wheels, and pipe lines connecting said radiators with the engine compartment to permit a circulation of the engine cooling water through said radiators.

3. In a motor vehicle as claimed in claim 2, in which said partition extends in spaced relation about the entire portion of the circumference of the rear wheel which is covered by the mudguard.

RUDOLF BŘEŽEK.

REFERENCES CITED

The following references are of record in the file of this patent:

UNITED STATES PATENTS

| Number | Name | Date |
|---|---|---|
| 2,078,067 | Duesenberg | Apr. 20, 1937 |
| 2,247,742 | Best | July 1, 1941 |

FOREIGN PATENTS

| Number | Country | Date |
|---|---|---|
| 189,008 | Switzerland | May 1, 1937 |